Figure 1:
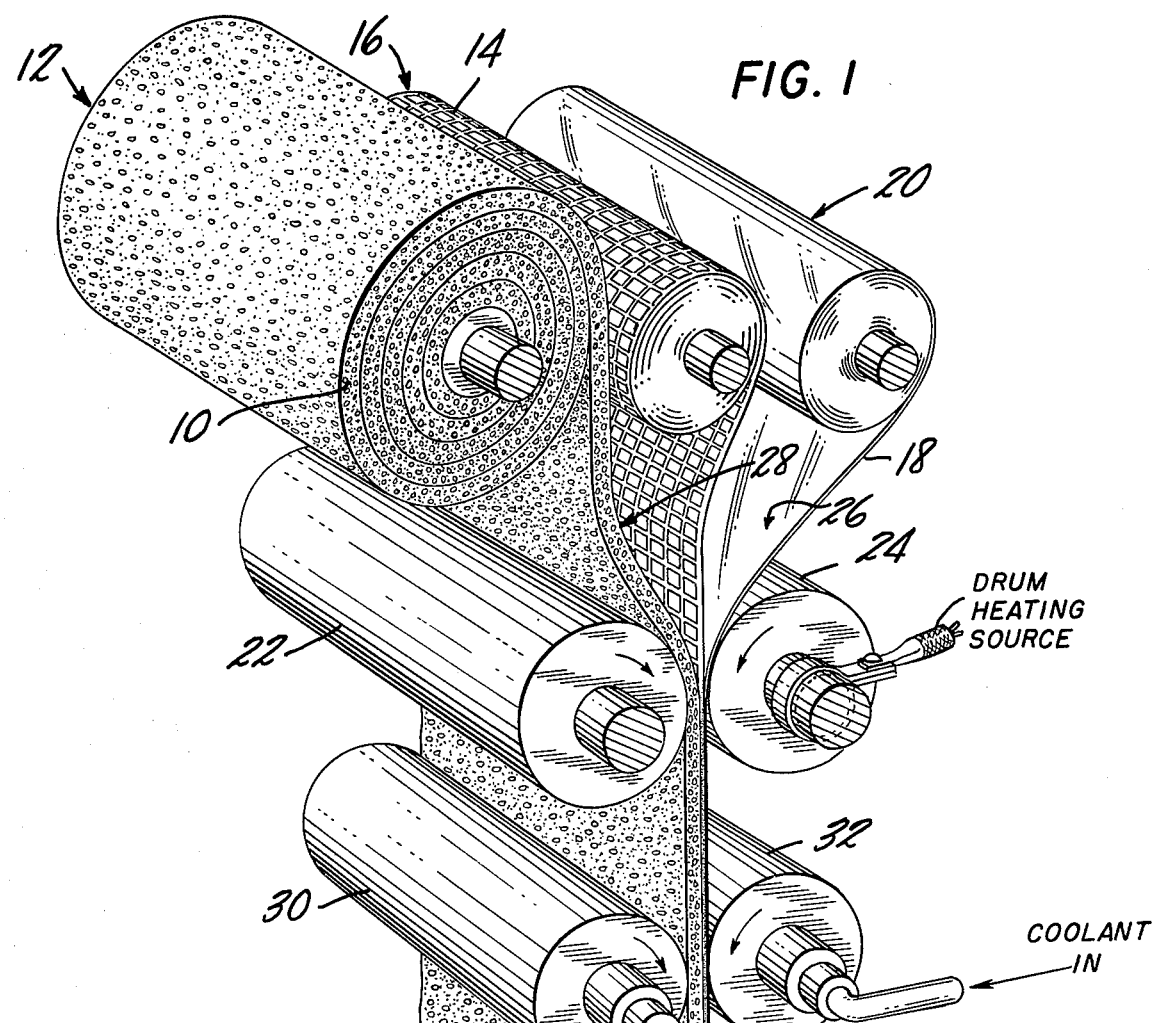

United States Patent [19]

Wiegand

[11] 4,088,805
[45] May 9, 1978

[54] REINFORCED THERMOPLASTIC FOAM SHEET

[75] Inventor: Donald E. Wiegand, Minneapolis, Minn.

[73] Assignee: Conwed Corporation, St. Paul, Minn.

[21] Appl. No.: 567,722

[22] Filed: Apr. 14, 1975

[51] Int. Cl.² ............................................. B32B 3/26
[52] U.S. Cl. ................................. 428/310; 156/285; 156/306; 428/76; 428/139; 428/247; 428/315; 428/910
[58] Field of Search ................ 428/110, 111, 74, 138, 428/76, 247, 252, 255, 310, 311, 313, 314, 315, 337, 910, 140; 156/272, 273, 285, 306, 309, 321, 322

[56] References Cited

U.S. PATENT DOCUMENTS

| 3,222,237 | 12/1965 | McKelvy | 428/110 |
| 3,264,166 | 8/1966 | Lowery | 428/247 |
| 3,423,263 | 6/1969 | Pannone | 156/79 |
| 3,446,685 | 5/1969 | Goldstone et al. | 428/310 |
| 3,607,603 | 9/1971 | Coverdale, Jr. | 428/315 |
| 3,616,130 | 10/1971 | Rogosch | 428/110 |
| 3,741,844 | 6/1973 | Schwartz | 428/315 |
| 3,748,217 | 7/1973 | May et al. | 428/314 |
| 3,936,565 | 2/1976 | Good | 428/315 |

FOREIGN PATENT DOCUMENTS 780,177  3/1968  Canada ................ 428/313

*Primary Examiner*—William J. Van Balen
*Attorney, Agent, or Firm*—Eyre, Mann, Lucas & Just

[57] ABSTRACT

A reinforced low density thermoplastic foam sheet is disclosed. The sheet is a laminate comprising outer laminae of low density thermoplastic foam and a thermoplastic film having about the same tackifying temperature as the foam and a central layer comprising a reinforcing net or net-like structure.

12 Claims, 2 Drawing Figures

U.S. Patent  May 9, 1978  4,088,805

REINFORCED THERMOPLASTIC FOAM SHEET

The present invention relates to reinforced low density thermoplastic foam sheets, especially low density polyethylene foam sheets.

Low density foam has found wide usage in a number of industries. However, because of its inherently low tear strength and its tendency to stretch under a tensile loading, there are many applications where it would be desirable to have a reinforcement for the polyethylene foam sheet. Typical of these end use areas are mattress insulators, mattress borders, sleep pads, mailing envelopes and a wide variety of other padding and cushioning applications where strength and resistance to stretch is necessary or desirable.

It would of course be possible to give some reinforcement to the low density foam sheet with a sheet of plastic material but, since plastic films are not overly strong, the plastic sheet would have to be quite thick in order to impart substantial additional strength to the foam sheet and this is undesirable both from an economic point of view and because of the fact that a thick reinforcing sheet will abort many of the desirable properties, especially flexibility and cushioning, of the low density foam sheet. The use of a reinforcing material such as a plastic net or net-like product of a stronger material such as nylon, oriented propylene, wire or the like would be considerably more desirable but problems arise with affixing such a net to a foam sheet. Adhesive materials which will adhere foams to other materials are very limited in number and even those which exist are generally quite expensive. Furthermore, these adhesives are liquids which create manufacturing problems because they may generate obnoxious solvent fumes and furthermore, being liquids, they are messy to use.

In accordance with the present invention, these disadvantages are overcome by affixing a net-like reinforcing member to a low density polyethylene or other thermoplastic foam sheet by use of a film of polyethylene or other thermoplastic film having a tackifying temperature about the same as that of the foam (within ± 10° F.). The net is sandwiched between the foam sheet and the film and then the foam sheet and film are heat sealed together, thereby entrapping the reinforcing net-like member.

Low density thermoplastic foams and especially low density polyethylene foams are quite well known in the art. The low density foams normally have a density of less than about ten pounds per cubic foot and in accordance with the present invention will preferably have a density of less than 6 pounds per cubic foot or even more preferably a density of less than four pounds per cubic foot. Best results in accordance with the present invention have been obtained with polyethylene foams of about 2.2 pounds per cubic foot but even those with a density as little as 1.50 pounds per cubic foot have been found to be desirable.

The reinforcing net-like structures of the present invention are preferably thermoplastic nets with strands which are integrally extruded at the joints. The essential feature is that they have a tackifying temperature at least of 50° F. above that of the foam and the film. The reason for this is that it is desired to affix the reinforcing net to the foam without heating it to the point where its beneficial properties such as strength are affected. Processes suitable for making these nets are taught for example in U.S. Pat. Nos. 3,384,692; 3,252,181; 3,112,526; 3,089,804; 3,178,328; 3,019,147; 3,118,180; 2,919,467 and 3,700,521. The most preferred reinforcing nets made in accordance with the present invention are formed according to U.S. Pat. Nos. 3,252,181 and 3,384,692 wherein a plurality of parallel longitudinal strands are extruded and a plurality of parallel transverse strands are integrally extruded therewith at spaced intervals.

If desired and preferable, a thermoplastic reinforcing net can be oriented after it is extruded. By orienting it is meant that the reinforcing net is heated and stretched at a temperature above its second glass transition temperature whereby the net takes a permanent stretch. Apparatuses and methods for orienting net-like materials are known in the art and are shown for example in British Pat. Nos. 1,235,901 and 905,252.

In the preferred form of the present invention, there are two sets of parallel strands which are extruded integrally with each other. However, it will be appreciated that the reinforcing nets according to the present invention could comprise more than two sets of strands.

The film used to affix the net or net-like structure to the low density foam sheet is suitably an extruded film of thermoplastic having about the same tackifying temperature as the foam sheet. While the foam and the film can thus be from dissimilar resins, it is preferred that they be from the same resin. As with the net, the film can be and preferably is biaxially oriented since this reduces cost, increases strength and enables the use of a thinner sheet of material. The film is suitably from about ½ mil to about 3 mils in thickness and preferably from about ¾ mil to 2 mils in thickness. Such films are readily available in the marketplace.

The method for attaching the net-like structure to the low density foam sheet by means of the film is preferably by heat sealing. One suitable method for accomplishing this is in a calendering operation as shown in FIG. 1 of the drawings. As there shown, polyethylene foam 10 from a roll 12, oriented polypropylene net 14 from a roll 16 and polyethylene film 18 from roll 20 are passed between nip rolls 22 and 24. Nip roll 24 i.e. the nip roll on the side of the laminate where the polyethylene film is introduced, is heated to soften and tackify the polyethylene film. The temperature of this roll is suitably 190°–250° F. There is pressure especially between the nip rolls 20 and 24 sufficient to embed the net 14 in the polyethylene foam 10 so that the surface 26 of the polyethylene film can come into contact with the surface 28 of the polyethylene foam through the interstices in the net to form a good heat seal between the two. The temperature of the rolls and their speed of rotation is controlled so that there is no detrimental heating of the polyethylene foam 28 which would cause cell collapse or the like. Such control is well within the skill of the art. After passing through nip rolls 22 and 24, the laminate structure is cooled as for example by passing through cooling nip rolls 30 and 32. Alternative methods of cooling such as water bath, forced air cooling or even ambient cooling may also be employed if desired. However, it is preferable that cooling be effected as soon as possible after the laminae pass through nip rolls 22 and 24 so that the bond between the polyethylene foam and the polyethylene film is not significantly weakened or destroyed by lifting off of the polyethylene film 18 due to pressure exerted against it by reinforcing net 14 due to relaxation of pressure on the resilient polyethylene foam 10. It will, of course, be appreciated that even with immediate cooling there will usually be some rise of the net due to the resiliency of the foam. However, since this will give an over-all taut structure, this is considered desirable.

Figure 2:
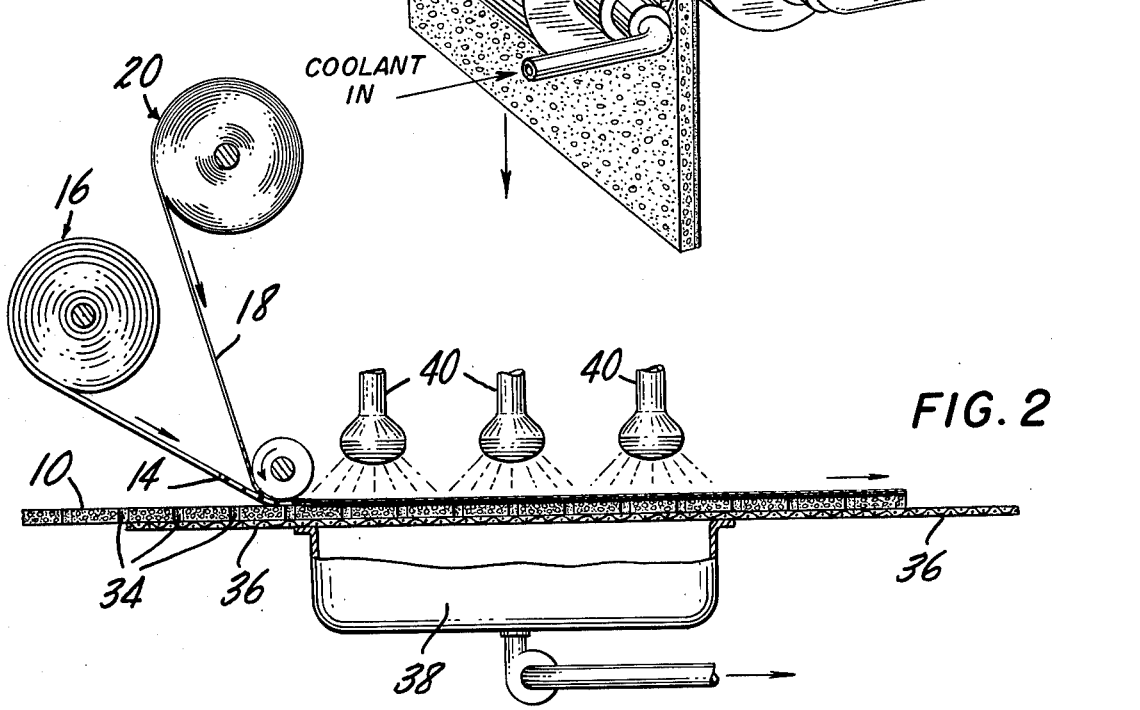

An alternative method for affixing of the three components is shown in FIG. 2. In this case the polyethylene foam 10 with perforations 34 suitably on one inch by one inch centers is drawn over a screen 36 with a vacuum box 38 positioned therebeneath. The oriented polypropylene net 14 and polyethylene film 18 are brought into contact with the polyethylene foam 10 and are pulled downward into tight contact by the force of suction in the vacuum box 38. The polyethylene film 18 is heated as for example by a radiant heat source 40. As with the apparatus of FIG. 1, the composite structure is cooled downstream of the heat sealing step.

The thicknesses of the foam sheet and of the reinforcing net are not critical. For example, the foam sheet can suitably be from about 1/16 inch to about 4 inches in thickness, and is preferably from about ⅛ inch to about 1 inch in thickness. The reinforcing net can be from about 8 mils to about 60 mils in thickness. However, since best seal between the polyethylene film and the polyethylene foam will be effected when the net is depressed into the foam during the heat sealing step, it is preferable that the polyethylene foam have a thickness which is at least as great as and preferably greater than the thickest part of the net. In this connection, it will be appreciated that certain reinforcing nets will have their greatest thickness at the joints, e.g., those nets made according to U.S. Pat. Nos. 3,384,692 or 2,919,467.

In one specific example a reinforced polyethylene foam sheet according to the present invention was made employing a polyethylene foam sheet of ¼ inch thickness and 2.2 pounds per cubic foot in density. A plastic net having approximately 4 strands per inch in both the horizontal and vertical directions and a weight of approximately 3 pounds per thousand square feet was employed. The polyethylene film employed had a thickness of about 1 mil. The reinforced polyethylene foam sheet according to the present invention was made with the apparatus of FIG. 1 employing a temperature in roll 24 of approximately 210° F. After formation, that net was immediately quenched in a water bath at ambient temperature (approximately 70° F.). A structure was formed in which the reinforcing net was very strongly locked to the polyethylene foam sheet by the polyethylene film.

It will be understood that the claims are intended to cover all changes and modifications of the preferred embodiments of the invention, herein chosen for the purpose of illustration, which do not constitute departures from the spirit and scope of the invention.

What is claimed is:

1. A reinforced low density thermoplastic foam sheet comprising:
   a. a first layer;
   b. said first layer being a sheet of low density thermoplastic foam of a density not over about 10 pounds per cubic foot;
   c. a second layer;
   d. said second layer being a thermoplastic film having a tackifying temperature which is within ± 10° F of that of the foam sheet;
   e. a third layer between the first and second layers;
   f. said third layer being a biaxially oriented polypropylene net-like structure having a tackifying temperature at least 50° F higher than the tackifying temperature of the foam sheet and the film;
   g. said net-like structure being at least partially embedded into said first layer, said second layer being in contact with said first layer;
   h. the second layer being heat sealed to the first layer through the interstices of said net-like structure; and
   i. said net-like structure being heat sealed to neither said first nor said second layer.

2. The reinforced low density thermoplastic foam sheet of claim 1 wherein the low density thermoplastic foam has a density no greater than six pounds per cubic foot.

3. The reinforced low density thermoplastic foam sheet of claim 1 wherein the low density thermoplastic foam has a density no greater than four pounds per cubic foot.

4. The reinforced low density thermoplastic foam sheet of claim 1 wherein the thermoplastic film has a thickness of from about ½ mil to about 3 mils.

5. The reinforced low density thermoplastic foam sheet of claim 1 wherein the thermoplastic film has a thickness from about ¾ mil to 2 mils.

6. The reinforced low density thermoplastic foam sheet of claim 1 wherein the thermoplastic foam sheet has a thickness at least as great as the thickest part of the reinforcing net-like structure.

7. A reinforced low density polyethylene foam sheet comprising:
   a. a first layer;
   b. said first layer being a sheet of low density polyethylene foam of a density not over about 10 pounds per cubic foot;
   c. a second layer;
   d. said second layer being a polyethylene film having a tackifying temperature which is within ± 10° F of that of the foam sheet;
   e. a third layer between the first and second layers;
   f. said third layer being a biaxially oriented polypropylene net-like structure having a tackifying temperature at least 50° F higher than the tackifying temperature of the foam sheet and the film;
   g. said net-like structure being at least partially embedded into said first layer, said second layer being in contact with said first layer;
   h. the second layer being heat sealed to the first layer through the interstices of said net-like structure; and
   i. said net-like structure being heat sealed to neither said first nor said second layer.

8. The reinforced low density polyethylene foam sheet of claim 7 wherein the low density polyethylene foam has a density no greater than six pounds per cubic foot.

9. The reinforced low density polyethylene foam sheet of claim 7 wherein the low density polyethylene foam has a density no greater than four pounds per cubic foot.

10. The reinforced low density polyethylene foam sheet of claim 7 wherein the polyethylene film has a thickness of from about ½ mil to about 3 mils.

11. The reinforced low density polyethylene foam sheet of claim 7 wherein the polyethylene film has a thickness from about ¾ mil to 2 mils.

12. The reinforced low density polyethylene foam sheet of claim 7 wherein the polyethylene foam sheet has a thickness at least as great as the thickest part of the reinforcing net-like structure.

* * * * *